United States Patent [19]
Berke et al.

[11] Patent Number: 5,779,788
[45] Date of Patent: Jul. 14, 1998

[54] CEMENT COMPOSITION

[75] Inventors: Neal Steven Berke, Chelmsford, Mass.; Michael Paul Dallaire, Dover, N.H.; Awdhoot Vasant Kerkar, Columbia, Md.

[73] Assignee: W.R. Grace & Co.-Conn., New York, N.Y.

[21] Appl. No.: 778,070

[22] Filed: Aug. 14, 1996

Related U.S. Application Data

[63] Continuation of Ser. No. 398,718, Mar. 6, 1995, abandoned.

[51] Int. Cl.$^6$ .................... C04B 24/02; C04B 24/16
[52] U.S. Cl. .................... 106/809; 106/725; 106/823; 524/4
[58] Field of Search .................... 106/802, 823, 106/809, 725; 524/4

[56] References Cited

U.S. PATENT DOCUMENTS

| | | | |
|---|---|---|---|
| 3,663,251 | 5/1972 | Moren et al. | 106/725 |
| 4,471,100 | 9/1984 | Tsubakimoto et al. | 525/367 |
| 4,547,223 | 10/1985 | Goto et al. | 106/802 |
| 4,946,904 | 8/1990 | Akimoto et al. | 106/823 |
| 5,142,036 | 8/1992 | Akimoto et al. | 106/823 |
| 5,158,996 | 10/1992 | Valenti | 524/5 |
| 5,174,820 | 12/1992 | Sakuta et al. | 106/724 |
| 5,362,323 | 11/1994 | Koyata et al. | 106/823 |
| 5,429,675 | 7/1995 | Cheung et al. | 106/823 |
| 5,432,212 | 7/1995 | Honda et al. | 106/823 |

FOREIGN PATENT DOCUMENTS 59-184753  10/1984  Japan.

*Primary Examiner*—Anthony Green
*Attorney, Agent, or Firm*—Craig K. Leon; William L. Baker; Howard J. Troffkin

[57] ABSTRACT

A cement admixture composed of a mixture of lower alkyl ether oxyalkylene adducts with a sulfonated organocyclic material to provide cement compositions of mortar and concrete which inhibit drying shrinkage while attaining very high slump and/or increased compressive strength.

11 Claims, No Drawings

5,779,788

1

CEMENT COMPOSITION

This is a continuation of application Ser. No. 08/398,718, filed Mar. 6, 1995, now abandoned.

BACKGROUND OF THE INVENTION

The present invention is directed to a cement admixture composition capable of causing the combined effects of inhibiting drying shrinkage of cement compositions while providing enhanced workability to the treated unset composition. The present admixture provides a synergistic effect of enhanced slump or ability to dramatically reduce the water to cement ratio to provide a cement structure of high compressive strength. Specifically, the present invention is directed to a cement admixture composed of a synergistic combination of certain monoalkyl ether alkylene oxide adducts and certain organocyclic materials, as fully described hereinbelow.

Hydraulic cement compositions, such as mortar (cement, small aggregate, e.g. sand, and water), or concrete (cement, small aggregate, large aggregate, e.g. crushed stone, and water), have certain properties which substantially effect their durability. One of these properties is shrinkage which normally occurs during drying of the cement composition.

Conventional hydraulic cement compositions display a decrease in volume with setting and drying of the cast composition. Although the magnitude of the volume decrease is normally small, it is of extreme importance. This shrinkage results in cracks and other defects which lower the serviceability and durability of the resultant structure. The cracks provide a path for air to penetrate into the structure, promoting carbonation of the cement and corrosion of the metal reinforcing bars contained therein. Further, the cracks provide a means for water to seep into and through the structure. Such water entry further deteriorates the structure through freeze-thaw cycling pressures exerted on the cement structure over its life. It is highly desired to provide a cement which exhibits high strength and is not subject to deterioration effects due to shrinkage and freeze-thaw cycling.

Various attempts have been made to avoid the cracking phenomenon caused by drying shrinkage. These include providing joints in the cement structure to concentrate the site of crack formation at the joint and, thereby, minimize such formation at other portions of the structure. Such joints are expensive to install; are not applicable to certain structures such as vertical walls, pillars and the like; and merely concentrate the area of cracking but do not alleviate them.

Other attempts include varying the composition of the cement, varying the methods of manufacture of concrete mix and varying the ballast material used in forming the resultant concrete structure. None of these attempts have resulted in a satisfactory solution. For example, cements have been formulated with expansive admixtures in attempts to counter the shrinkage of the concrete. However, it is difficult to determine the proper amount of expansive admixture required to counter the drying shrinkage which develops. The use of such materials thereby give rise to unpredictable results.

With respect to overcoming the drying shrinkage of cement compositions, such as concrete compositions, the literature teaches that various oxyalkylene adducts are suitable for this purpose. For example, U.S. Pat. Nos. 3,663,251 and 4,547,223 suggest the use of compounds of the general formula $RO(AO)_nH$ in which R may be a $C_{1-7}$ alkyl or $C_{5-6}$ cycloalkyl radical, A may be $C_{2-3}$ alkylene radicals and n is 1–10, as shrinkage reducing additives for cement. Similarly, U.S. Pat. No. 5,174,820 suggests terminally alkyletherified or alkylesterified oxyalkylene polymers as useful for shrinkage reduction. Still further, Japanese Patent Application 58-60293 provides the suggestion that shrinkage reduction of cement can be accomplished by the addition thereto of compounds which are aliphatic, alicyclic or organocyclic group terminated oxyethylene and/or oxypropylene repeating chain compounds. These oxyalkylene adducts do not enhance the flow properties of the treated cement to any degree except that, as liquid admixture materials, they can be counted as part of the total liquid being used to produce the initial cement composition.

Cement compositions, particularly mortars and concretes, have been treated with conventional water reducing agents. Such agents have been used to enhance flowability (increase slump) of a treated cement composition at a fixed water-to-cement ratio to provide a composition which can be readily pumped and/or is essentially self-leveling. Alternately, such agents have been used to permit normal workability of a treated cement composition while reducing the water to cement ratio. It is known that a reduction in the water to cement ratio of a specific cement composition recipe will provide a resultant structure having enhanced compressive strength. A combination of enhanced fluidization and compressive strength can be achieved by utilizing specific amounts of such agents and water-to-cement ratio. It is highly desired to have an admixture which is capable of inhibiting the drying shrinkage of cement compositions and can provide dramatic fluidization to unset cement composition and/or provide a resultant cement composition structure which has enhanced compressive strength.

SUMMARY OF THE INVENTION

The present invention is directed to a cement admixture, a cement having the admixture incorporated therein and a method of forming an improved cement structural composition, which is capable of inhibiting drying shrinkage while providing a high slump to the unset composition to permit casting thereof and/or enhancing the compressive strength of the resultant structure. The admixture comprises a synergistic mixture of an oxyalkylene ether adduct having the Formula (I), $RO(AO)_nH$ wherein A is selected from $C_2$–$C_4$ alkylene groups, n has a value of 1 to 5 and R is a $C_1$–$C_7$ alkyl or $C_5$–$C_6$ cycloalkyl group; in combination with certain sulfonated organocyclic materials, as described below.

DETAILED DESCRIPTION

It has been unexpectedly found that when the specific combination of oxyalkylene adducts and certain sulfonated organocyclic materials are used, one attains the desired combination of inhibition of drying shrinkage of the treated cement structure while providing an unexpected high slump and/or compressive strength.

The present invention is specifically directed to a combination of certain alkyl ether oxyalkylene adducts and certain sulfonated organocyclic materials selected from naphthalene sulfonate formaldehyde condensates, melamine formaldehyde condensate. The term "organocyclic" as used herein and in the appended claims shall include compounds having six member (carbon atom or carbon-nitrogen atoms) ring or condensed ring containing compounds having three unsaturated double bonds associated with the ring, such as benzenyl, naphthalenyl, triazinyl and the like.

The subject cement admixture requires the use of an alkyl ether oxyalkylene adduct represented by the formula RO(AO)$_n$H (Formula I) wherein R represents a C$_1$–C$_7$ alkyl or a C$_5$–C$_6$ cycloalkyl, preferably a C$_3$–C$_5$ alkyl group. Examples of such R groups are methyl, ethyl, propyl, isopropyl, n-butyl, isobutyl, tertiary butyl, n-pentyl, isopentyl, cyclopentyl, cyclohexyl and the like. The preferred R groups are C$_3$–C$_5$ alkyl, such as propyl, isopropyl, n-butyl, t-butyl, isopentyl and the like. The most preferred adducts have R groups of butyl or cyclohexyl. The symbol A in the above formula represents at least one C$_2$–C$_4$ alkylene group such as, for example,

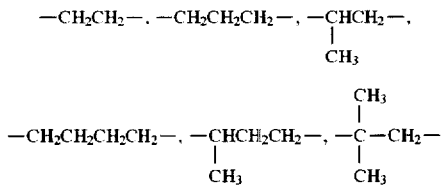

and the like and mixtures thereof; O represents an oxygen atom; n represents an integer of 1 to 5. The preferred ether adducts are those having an R which represents a C$_3$–C$_5$ alkyl, most preferably a butyl group. A which represents an ethylene or propylene and wherein n is 2 or 3. The most preferred adduct is dipropylene glycol mono-t-butyl ether and tripropylene glycol mono-t-butyl ether.

A wide variety of materials are known to act as fluidizing agents for cement compositions. These can be categorized as water reducing agents of the organocyclic compound family, such as naphthalene sulfonate formaldehyde condensate, melamine sulfonate formaldehyde condensate and lignin sulfonate and the like as well as oxygenated compounds such as oxyalkylene or polyoxyalkylene containing compounds, as disclosed in Japanese Patent Publication (KOKAI) Nos. 285140/88 and 163108/90 and copolymers of hydroxy terminated allylether and maleic anhydride or their salts and esters, such as disclosed in U.S. Pat. No. 4,471,100 or esterified maleic anhydride/styrene copolymers, such as disclosed in U.S. Pat. No. 5,158,996. All of the above compounds and others are known to provide enhanced slump to cement compositions. To further enhance the slump of a cement composition requires the undesired use of large dosages of these additives or of high water to cement ratios in combination with such additives. Both of these methods are unacceptable.

It has been unexpectedly found that when one uses the above described adduct in combination with sulfonated organocyclic materials in certain specific ratios, one attains admixture products which are capable of inhibiting drying shrinkage while imparting very high slump not attributable to either component or expected from the combined components. The present combination thus can be used either to provide a cement composition which is self-leveling and can be readily pumped to an application site or can have its water-to-cement ratio reduced to a very high degree to provide a product of enhanced compressive strength. Because of the very high degree of fluidity imparted by the present combination, one can readily impart both fluidity to the unset composition while reducing the water to cement ratio to enhance the compressive strength of the structural product.

The sulfonated organocyclic materials to be used in combination with the adduct described above are naphthalene sulfonate formaldehyde condensate, or melamine sulfonate formaldehyde condensate. Although each of these materials is a known water reducer for cements, when used with the present adduct, the combination provides dramatically enhanced flow properties.

The subject cement admixture should contain adduct to sulfonated organocyclic material in a weight ratio of from about 0.7 to 7, preferably from about 1.5 to 3. The cement admixture components may be added to the cement either separately in the form of neat materials or as aqueous solutions. Alternately, the admixture components can be formed into a homogeneous composition composed of a neat mixture of adduct and sulfonated organocyclic material. Such a homogeneous composition can be formed by mixing the liquid adduct and solid powder sulfonated organocyclic material with small amounts (from about 0.1 to 1% based on solid organocyclic material of a carboxylic acid derivative surfactant, such as sodium dioctyl sulfosuccinate and the like. The neat stable admixture composition is preferably formed by subjecting the materials to shear mixing or the like for short periods of time. The resultant admixture can be readily transported to the application site and mixed with the water of hydration or directly applied to the unset wet cement composition.

The admixture composition of the present invention may be used with hydraulic cements suitable for structural application, such as ordinary, quick-hardening and moderate-heat portland cements, high alumina cements, blast-furnace slag cement and the like. Of these, portland cements of the ordinary and quick-hardening types are particularly desired and most readily used to form architectural structural members.

The improved cement of the present invention is composed of a substantially uniform mixture of a hydraulic cement and the subject cement admixture. The improved cement may be formed at any stage of the cement's formation or use, such as by applying the admixture to cement powder during the blending with other dry materials to prepare a specific type of cement. Although small amounts of water may be present during the blending, the amount of water will be insufficient to cause substantial hydration of the cement.

Alternately, an improved cement composition can be formed in situ during the course of preparing a cement composition such as a mortar mix or a concrete. The admixture composition can be added either separately (either as separate components or as a neat composition) or as part of the water of hydration. When the admixture is in the form of an aqueous solution, the water content of the solution should be calculated as part of the total water content of the cement composition.

The cement admixture of the present invention should be present in the cement composition such that the adduct is in from about 0.5 to about 4, preferably about 1 to about 2 weight percent based on the weight of cement content of the cement composition being treated. The sulfonated organocyclic material should be present in from about 0.35 to 1, preferably from about 0.5 to 0.9 percent by weight based on the weight of cement content of the cement composition. The quantity of water used for setting the cement composition can vary within the weight ratios of water to cement of from 0.25:1 to 0.7:1, preferably 0.3:1 to 0.5:1. Aggregate, such as pebble, gravel, sand, pumice or fired perlite, as required, may be employed in conventional amounts. As stated above, the water to cement ratio can be dramatically reduced when using the present admixture to provide a fluid cement composition capable of attaining high compressive strength.

Various conventional ingredients may be optionally used. Among the optionally employable ingredients are: conventional hardening accelerators, e.g. metal chlorides, such as calcium chloride and sodium chloride, metal sulfates, such as sodium sulfate, and organic amines such as triethanolamine; ordinary hardening retarders, such as alcohols, sugars, starch and cellulose; reinforcing-steel corrosion inhibitors, such as a sodium nitrate and calcium nitrite; air entraining agents, such as tall oil fatty acids and their esters, gum resins and rosins, sulfite liquors; and the like and mixtures thereof.

The treated cement composition having the cement admixture of the present invention may be applied in conventional ways. For example, it may be cast and troweled, filled in forms, applied by spraying, or the like. Hardening or curing of the concrete and the like may be accomplished by any of the air drying, wet air, water and heat-assisted (steam, autoclave, etc.) curing techniques. If desired, two or more such techniques may be combined. The respective curing conditions may be the same as in the past.

The addition of the cement admixture composition of the present invention to a cement will markedly reduce the drying shrinkage of the resulting cement composition (e.g. mortar and concrete) compared with that of untreated compositions and will provide a composition of very high slump which can be reduced by lowering of the water to cement ratio to provide a resultant set structure of enhanced compressive strength. The combination of enhanced slump and compressive strength can be readily achieved by the present invention.

The following examples are given for illustrative purposes only and are not meant to be a limitation on the invention as defined by the claims appended to this specification. All parts and percentages are by weight unless otherwise indicated. The term "S/S" means weight of solid additive based on weight of hydraulic cement.

EXAMPLE 1

Concrete mixes were formulated with a mix design of fine aggregate equal to 1330 pounds per cubic yard West Sand, 1850 pounds per cubic yard Wrentham Crushed Stone (ASTM c-cc Grade 67), 517 pounds per cubic yard of Portland cement and a water (or water and indicated liquid additives) to cement ratio (L/C) of 0.44. The concrete mixes contained an air entraining agent (a commercial tall oil based product, Darex II 0.4 oz/100 lbs of cement sold by W. R. Grace & Co.) in amounts to maintain the air content substantially constant. The concrete mixtures were proportioned by the volumetric method according to American Concrete Institute guidelines. Samples were formed with adduct alone or NSF alone as well as with a mixture of adduct and NSF as part of the water of hydration. The concrete was mixed according to ASTM C-192 ("Making and Curing Concrete Specimens in the Laboratory"). Plastic concrete tests of slump was measured according to ASTM C-143.

These samples were formed to show the effect the present admixture has on the slump of the treated composition. The results are shown in Table I below.

TABLE I

| Sample | Admixture | Dosage Adduct/NSF (% S/S) | L/C Ratio | 28 Day Compressive Strength (psi) | Slump (inch) |
|---|---|---|---|---|---|
| 1 | NSF | 0.0/0.4 | 0.44 | 5530 | 2.5 |
| 2 | DPTB/NSF | 1.4/0.4 | 0.44 | 5445 | 5.5 |

DPTB = Dipropylene glycol-t-butyl alcohol adduct
NSF = naphthalenesulfonate-formaldehyde condensate (WRDA-19)
S/S = solids additives based on solid weight of hydraulic cement component.

The data in Table I shows that the subject admixture illustrated by Sample 2 provides more than a twofold increase in slump to a concrete composition at constant liquid to cement ratio in comparison to Sample 1 containing only the conventional water-reducing NSF. It is known that DPTB does not enhance slump to cement compositions.

Further concrete mixes were formed in the same manner as described above except that the mix design of fine aggregate equal to 1242 pounds per cubic yard, crushed stone equal to 1750 pounds per cubic yard, portland cement equal to 658 pounds per cubic yard and water (or water plus indicated liquid additives) to cement at a ration (L/C) adjusted, as indicated, to attain a substantial uniform compressive strength concrete. The results, given in Table II below, show that NSF alone (Sample 4) permitted a reduction in water to achieve the compressive strength while causing only a small deviation in slump with respect to the blank (Sample 3). The presence of only alkyl ether oxyalkylene adduct, DPTB, did not enhance slump (Sample 5). Sample 6 which contained the subject combination of components with the low L/C ratio, as used in Sample 4, provided a very high slump material which still attained the highest compressive strength of the group of samples.

TABLE II

| Sample | Admixture | Dosage Adduct/NSF (% S/S) | L/C Ratio | 28 Day Compressive Strength (psi) | Slump (inch) |
|---|---|---|---|---|---|
| 3 | — | —/— | 0.49 | 6270 | 5.0 |
| 4 | NSF | —/0.4 | 0.43 | 6560 | 4.0 |
| 5* | DPTB | 1.2/— | 0.48 | 6650 | 5.0 |
| 6* | DPTB/NSF | 1.2/0.4 | 0.43 | 6795 | 10.0 |

*contained 0.3% S/S dipropylene glycol cement additive

EXAMPLE 2

A series of micro-concrete samples were prepared to determine the effect on slump by the subject cement admixture as well as, for comparison, the use of an alkyl ether oxyalkylene adduct alone and naphthalene sulfonate formaldehyde condensate alone.

The micro-concrete was formed by blending 800 parts Type I portland cement with a mixture of the following ASTM graded aggregates: 475 parts F-95 sand, 432 parts of C-109 sand, 432 parts of C-185 sand, and 821 parts of 15-S sand. The dry blending was conducted in a Hobart mixer for about two minutes to attain a uniform blend having an aggregate to cement ratio of 2.7. To the blend was added 320 parts of water (or water plus liquid admixture materials) indicated below. The water and cement ratio was adjusted to provide a constant total liquid to cement ratio in all samples. The slump was measured for each triplicate set of samples according to ASTM C-143 and the results are given in Table III below.

TABLE III

| | Admixture | | | | |
|---|---|---|---|---|---|
| Sample | NSFC % | DPTB % | W/C | L/C | Slump (cm) |
| 7 | — | — | 0.4 | 0.4 | 0.8 |
| 8 | — | 1.2 | 0.387 | 0.4 | 0.5 |
| 9 | 0.3 | — | 0.4 | 0.4 | 1.0 |
| 10 | 0.3 | 1.2 | 0.387 | 0.4 | 1.2 |

TABLE III-continued

| Sample | Admixture NSFC % | Admixture DPTB % | W/C | L/C | Slump (cm) |
|---|---|---|---|---|---|
| 11 | 0.60 | — | 0.4 | 0.4 | 4.4 |
| 12 | 0.60 | 1.2 | 0.387 | 0.4 | 9.7 |

The above results show that the combination of adduct and NSF within the ratio taught by the present invention provides a unique and unexpected high slump not attainable by either material alone or expected by additive effect. The resultant material would provide a self-leveling type of concrete. Further, one could reduce the w/c ratio to attain increased compressive strength while still retaining a highly fluid composition.

EXAMPLE 3

Samples were formed in the same manner as described in Example 2 except that melamine sulfonate formaldehyde condensate (MSFC) (Melment) was used instead of NSF of Example 2. The results given in Table IV below show that when one uses the subject adduct in combination with MSFC in the prescribed ratio one achieves unexpected high fluidity.

TABLE IV

| Sample | Admixture MSFC % | Admixture DPTB % | W/C | L/C | Slump (cm) |
|---|---|---|---|---|---|
| 7 | — | — | 0.4 | 0.4 | 0.8 |
| 8 | — | 1.2 | 0.387 | 0.4 | 0.5 |
| 13 | 0.4 | — | 0.4 | 0.4 | 1.4 |
| 14 | 0.8 | — | 0.4 | 0.4 | 3.0 |
| 15 | 0.4 | 1.2 | 0.387 | 0.4 | 1.6 |
| 16 | 0.8 | 1.2 | 0.387 | 0.4 | 8.4 |

EXAMPLE 4

For comparative purposes, a series of micro-concrete samples were prepared in the same manner as described in Example 2 above except that other commercially available water-reducing agents, lignin sulfonate (WRDA-79 of W. R. Grace & Co.) or an alkyl terminated alkoxy allyl ether/maleic anhydride copolymer (AKM-0531 of Nippon Oil & Fat Co.) was used instead of NSF of Example 2. The materials were used in both low and high weight ratio ranges with respect to the adduct. None of these combinations provided the high slumps achieved by the presently described combination. In certain instances, a lower slump was obtained. The results attained with lignin sulfonate are shown in Table V below and attained with the oxygenated copolymer are shown in Table VI below.

TABLE V

| Sample | Admixture Lignin % | Admixture DPTB % | W/C | L/C | Slump (cm) |
|---|---|---|---|---|---|
| 7 | — | — | 0.4 | 0.4 | 0.8 |
| 8 | — | 1.2 | 0.387 | 0.4 | 0.5 |

TABLE V-continued

| Sample | Admixture Lignin % | Admixture DPTB % | W/C | L/C | Slump (cm) |
|---|---|---|---|---|---|
| 17 | 0.31 | — | 0.4 | 0.4 | 0.9 |
| 18 | 0.31 | 1.2 | 0.387 | 0.4 | 1.3 |
| 19 | 0.60 | — | 0.4 | 0.4 | 7.5 |
| 20 | 0.60 | 1.2 | 0.387 | 0.4 | 3.8 |

TABLE VI

| Sample | Admixture Copolymer % | Admixture DPTB % | W/C | L/C | Slump (cm) |
|---|---|---|---|---|---|
| 7 | — | — | 0.4 | 0.4 | 0.8 |
| 8 | — | 1.2 | 0.387 | 0.4 | 0.5 |
| 21 | 0.07 | — | 0.4 | 0.4 | 1.2 |
| 22 | 0.07 | 1.2 | 0.387 | 0.4 | 1.3 |
| 23 | 0.14 | — | 0.4 | 0.4 | 4.9 |
| 24 | 0.14 | 1.2 | 0.387 | 0.4 | 2.9 |

What is claimed is:

1. A cement admixture comprising a mixture of (a) at least one alkyl ether oxyalkylene adduct represented by the formula RO(AO)$_n$H wherein A is a C$_2$–C$_4$ alkylene radical, O is oxygen, R is a C$_1$–C$_7$ alkyl or C$_5$–C$_6$ cycloalkyl group, and n is an integer of from 1 to 5; and (b) a sulfonated organocyclic material in a weight ratio of (a) to (b) in the range of 0.7 to about 7.

2. The admixture of claim 1 wherein component (b) is selected from the group consisting of naphthalene sulfonate formaldehyde condensate or melamine sulfonate formaldehyde condensate.

3. The admixture of claim 2 wherein the weight ratio of (a) to (b) is in the range of from about 1.5 to about 3.

4. The admixture of claim 2 wherein R represents a butyl group and n represents an integer of 2 or 3 and component (b) is naphthalene sulfonate formaldehyde condensate.

5. The admixture of claim 2 wherein R represents a butyl group and n represents an integer of 2 or 3 and component (b) is melamine sulfonate formaldehyde condensate.

6. The admixture of claim 2 further comprising a cement additive selected from the group consisting of hardening accelerators, hardening retarders, corrosion inhibitors, and air entraining agents.

7. The admixture of claim 2 wherein the admixture is a homogeneous composition composed of a neat mixture of adduct, sulfonated organocyclic material and from about 0.1 to 1 percent by weight of a carboxylic acid derivative surfactant based on the weight of the sulfonated organocyclic material.

8. An improved cement composition comprising a mortar composition composed of a hydraulic cement, sand and water or a concrete composition composed of hydraulic cement, sand, large aggregate and water wherein the hydraulic cement comprises an admixture according to claims 1, 2, 3, 4, 5, 6, or 7, which comprises from 0.5 to about 4 weight percent of component (a) and from 0.35 to 1 weight percent of component (b) based on the weight of hydraulic cement.

9. The cement composition of claim 8 which is a concrete composed of hydraulic cement, sand, aggregate and water and said water to cement ratio is from 0.25 to 0.7.

10. A method of preparing a cement composition comprising introducing into an unset cement composition a mixture comprising (a) from about 0.5 to 4 weight percent based on the cement content of the composition of at least one alkyl ether oxyalkylene adduct represented by the formula $RO(AO)_nH$ wherein A is a $C_2$–$C_4$ alkylene radical, O is oxygen, R is a $C_1$–$C_7$ alkyl or $C_5$–$C_6$ cycloalkyl group, and n is an integer of from 1 to 5; and (b) from about 0.5 to 1 weight percent based on the weight of the cement content of the composition of a sulfonated organocyclic material, said components (a) and (b) being present in a weight ratio of about 0.7 to about 7; casting and shaping the cement composition; and permitting said composition to cure.

11. The method of claim 10 wherein component (b) is selected from the group consisting of naphthalene sulfonate formaldehyde condensate or melamine sulfonate formaldehyde condensate.

* * * * *